No. 870,163. PATENTED NOV. 5, 1907.
A. E. GLASCOCK.
TRACTION WHEEL.
APPLICATION FILED APR. 9, 1907.
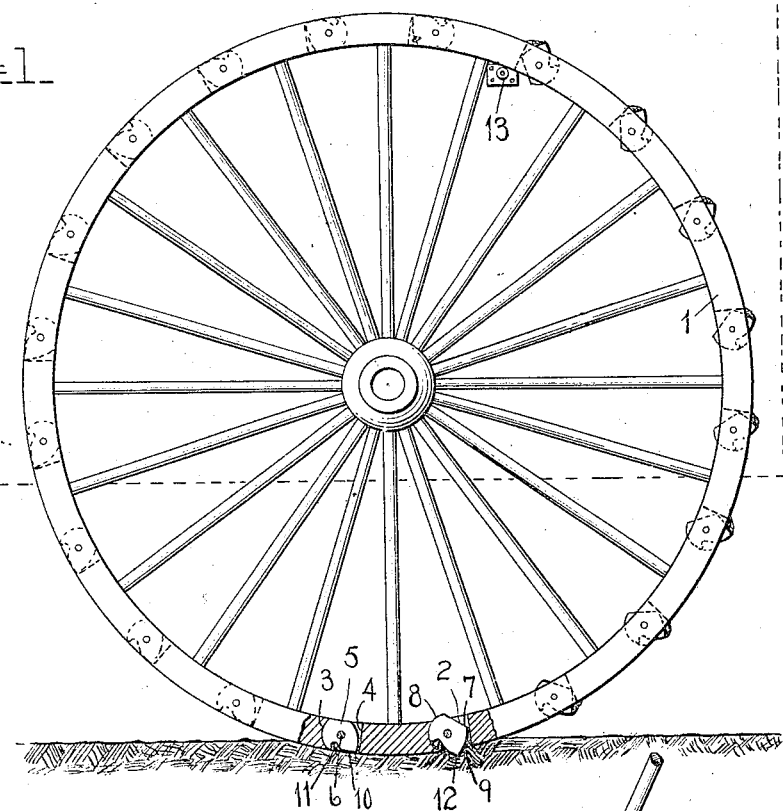
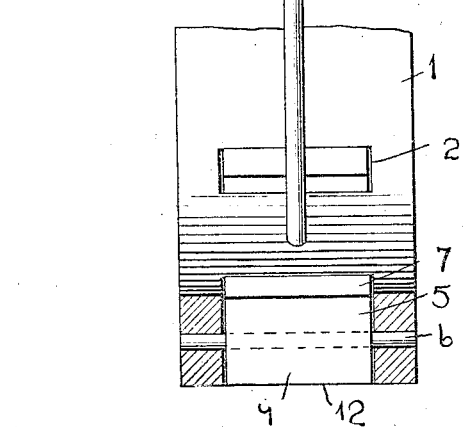
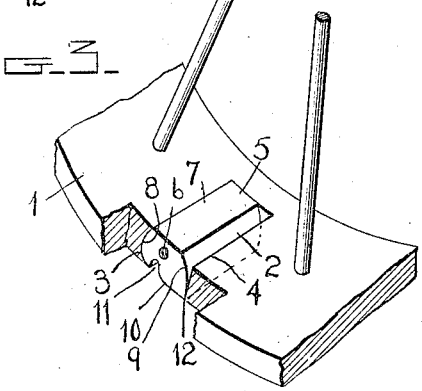
Inventor
Alfred E. Glascock
Witnesses
L. B. James
F. Liebschutz
By
Wm. S. Hodges
Attorney

UNITED STATES PATENT OFFICE.

ALFRED E. GLASCOCK, OF WASHINGTON, DISTRICT OF COLUMBIA, ASSIGNOR, BY MESNE ASSIGNMENTS, TO FARM MOTOR COMPANY, A CORPORATION OF SOUTH DAKOTA.

TRACTION-WHEEL.

No. 870,163.   Specification of Letters Patent.   Patented Nov. 5, 1907.

Application filed April 9, 1907. Serial No. 367,229.

*To all whom it may concern:*

Be it known that I, ALFRED E. GLASCOCK, a citizen of the United States, residing at Washington, in the District of Columbia, have invented certain new and useful Improvements in Traction-Wheels, of which the following is a specification.

This invention has relation to traction wheels, and it consists in the novel construction and arrangement of its parts as hereinafter shown and described.

The object of the present invention is to provide a wheel of the character stated with a series of pivoted tractors which are so mounted upon the wheel rim as to be automatically forced out beyond the rim of the wheel should the said wheel slip or spin in soft earth, mud or sand. Normally the said tractors lie wholly within the rim of the wheel, and are so positioned when the wheel is passing over hard roads, pavements or bridges, consequently they can do no damage to the surfaces of such highways. Means is provided for returning the said tractors to the interior of the wheel rim at each revolution thereof, thus the said tractors cannot remain in extended position with relation to the wheel rim, and can assume such positions only as a consequence of slipping or spinning of the wheel, which slipping or spinning can occur only in soft earth, mud or sand.

Heretofore attempts have been made to provide traction wheels with effective and unobjectionable movable tractors, but for the greater part such devices have been unsatisfactory, inasmuch, as they all depend upon a lever or other manually operated means for moving the tractors with relation to the wheel rim. When such constructions are relied upon they require the attention of an operator, or if neglected by the operator may be the source of damage both to the engine and the roadway to no inconsiderable degree. If through oversight or neglect such tractors are permitted to remain extended with relation to the wheel rim while the engine is passing over a hard road, bridges, etc., the said tractors will mutilate the surface of the thoroughfare and as each tractor comes in contact with the said surface the engine must partially or entirely lift itself bodily over the tractor which operates as a chock and necessarily impedes the speed of the engine and subjects the same to unnecessary jarring and jolting and the damage to the machinery incidental thereto. Furthermore in order to project the tractors much energy must be expended for unless the traction wheel is in very soft mud the engine must be at least partially lifted in order to have the tractors extend to their greatest degree.

In my present invention all of these objections are effectually overcome as the tractors require no attention on the part of an operator, as they normally lie within the wheel rim and consequently the engine may be run over hard surfaces with impunity, and without damage to either engine or road. As they are automatically extended only as a consequence of slipping or spinning of the wheel, which can only occur in soft ground as above pointed out, they are projected by the energy of the engine, which energy is usually wasted, and they therefore do not call for such laborious manual exertion in order to be extended, as movable tractors have heretofore required.

In the accompanying drawing:—Figure 1, is a side elevation of a traction wheel partly in section equipped with the tractors. Fig. 2, is a transverse sectional view of a portion of the wheel rim; and Fig. 3, is a perspective view of a portion of the wheel rim partly in section.

The wheel comprises the rim 1, which is provided at suitable intervals with the openings 2. Each of the said openings is provided with the front arcuate wall 3, and the rear straight wall 4. The tractors 5 are pivotally mounted upon the pins 6, which extend transversely through the wheel rim and through the openings 2 thereof. The said tractors are of peculiar configuration. Each is provided with a top flat surface 7, a front arcuate surface 8, which fits snugly against the wall 3, of its receiving opening; the opposite curved surface 9, and the under surface 10. The surface 10, is provided with a transversely extending groove which is located slightly in advance of the pin 6. The surfaces 9 and 10, meet in an acuminate edge 12. The groove 11 is disposed from the under surface of the tractor toward the forward curved surface 8 thereof. The pin 13 is fixed to a stationary point at the side of the engine and has its end lying in the path of the inwardly projecting portions of the tractors when the latter are extended, whereby the tractors will be returned to their normal positions. The wheel thus equipped with tractors will pass over smooth streets, roads or bridges without injury to the same; when, however, the wheel enters soft mud or earth and begins to slip or spin, the soft material pushing up into the grooves 11, will turn the tractors on the pins 6, and the acuminate edges thereof will bite or project down into the mud or earth and check the spinning of the wheel. Thus the tractors are automatically projected by the slipping or spinning of the wheel, but will remain within the wheel rim so long as the said rim is upon solid ground. By providing the tractors of the peculiar shape described the openings through the wheel rim may be made with all of its wall straight except the front wall thereof, and consequently the said openings may be readily cut and machined as they are devoid of minor obliquely disposed surfaces.

It will thus be seen that the peculiar configuration necessary to the proper operation of the tractors, resides in the tractors themselves, which are small parts comparatively and may be readily forged, while the openings in the large wheel rim are simplified in their construction.

Having described my invention, what I claim as new and desire to secure by Letters Patent is:—

1. A traction wheel having its rim provided with openings, movable tractors mounted in said openings and normally lying wholly within the same, and means whereby said tractors will be automatically projected when the wheel passes over a soft traction surface.

2. A traction wheel provided with a rim having openings therein, tractors pivoted in said openings and normally lying wholly within the same, and means whereby said tractors will be automatically projected when the wheel passes over a soft traction surface.

3. A traction wheel having a rim provided with openings, said openings having three straight walls and one arcuate wall and tractors pivoted in said openings.

4. A traction wheel having a rim provided with openings, said openings having three straight walls and one arcuate wall, tractors pivoted in said openings and having arcuate sides which fit snugly against the arcuate walls of the openings.

5. A traction wheel having a rim provided with openings having three straight walls and an arcuate wall, tractors pivoted in said openings and having sides which meet at an acuminate edge.

6. A traction wheel having a rim provided with openings having three straight walls and an arcuate wall, tractors having arcuate sides which fit snugly against said arcuate walls and sides which meet at an acuminate edge.

7. A traction wheel having a rim provided with openings having three straight walls and an arcuate wall, tractors pivoted in said openings and having arcuate sides which fit snugly against said arcuate walls and sides which meet at an acuminate edge.

8. A traction wheel having a rim provided with openings, tractors pivoted in said openings and having sides which meet at an acuminate edge, and means whereby said tractors will be automatically projected when the wheel passes over a soft traction surface.

9. A traction wheel having a rim provided with openings, tractors pivoted in said openings and having sides provided with grooves.

10. A traction wheel having a rim provided with openings, tractors pivoted in said openings and having sides with grooves extending transversely with relation to the rim.

11. A traction wheel having a rim provided with openings, tractors pivoted in said openings and having sides which meet at acuminate edges which are located upon one side of the pivots, and grooves located upon the opposite sides of the pivots.

In testimony whereof I affix my signature, in presence of two witnesses.

ALFRED E. GLASCOCK.

Witnesses:
BERT. F. AMOS,
JOS. S. DUFFY.